E. S. KINTZ.
VEHICLE WHEEL.
APPLICATION FILED OCT. 18, 1907.
922,597.
Patented May 25, 1909.
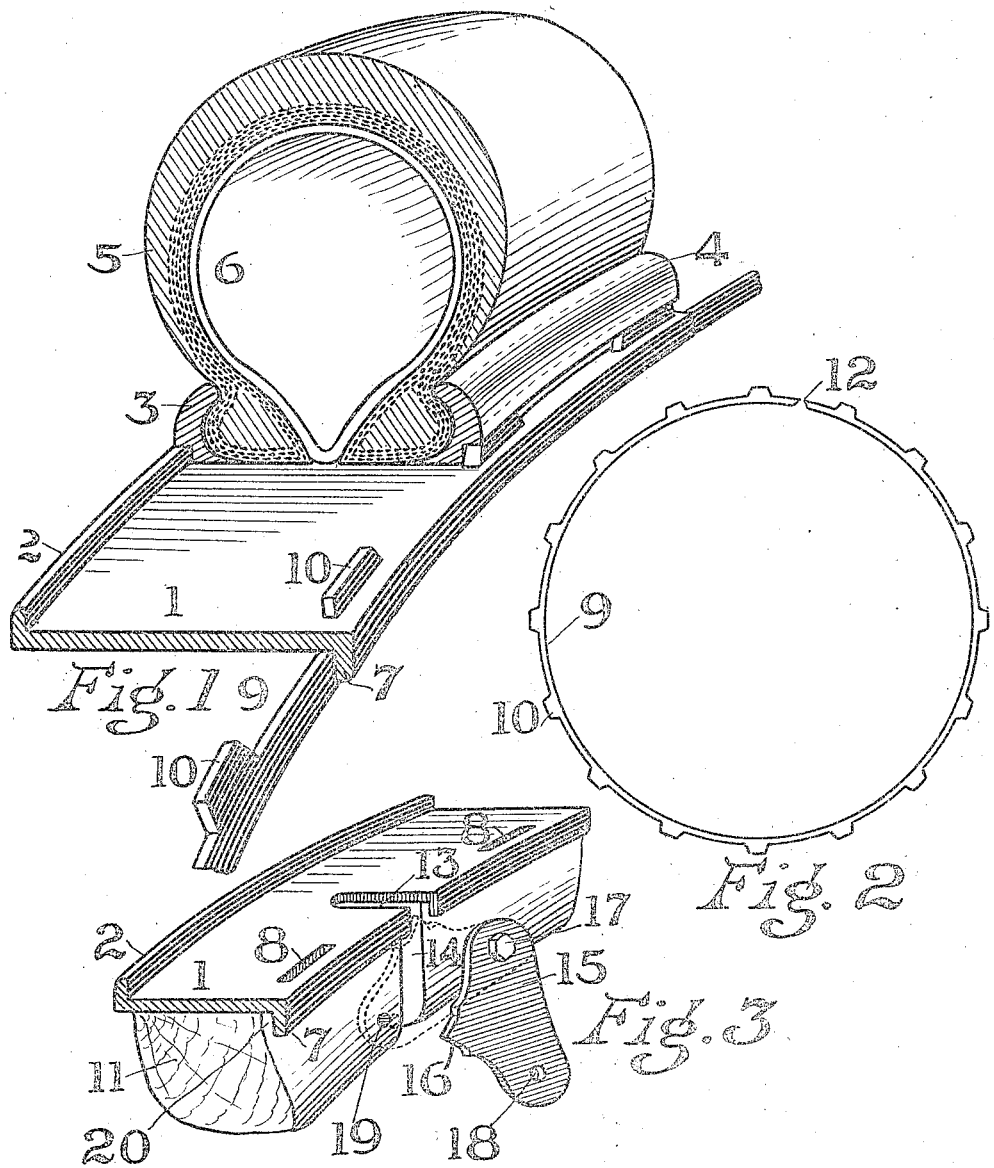
Witnesses:
Elma Blinn
Glenara Fox
INVENTOR—
Ervin S. Kintz,
BY C. E. Humphrey,
ATTORNEY.

UNITED STATES PATENT OFFICE.

ERVIN S. KINTZ, OF KENMORE, OHIO, ASSIGNOR OF ONE-HALF TO M. OTIS HOWER, OF AKRON, OHIO.

VEHICLE-WHEEL.

No. 922,597.      Specification of Letters Patent.      Patented May 25, 1909.

Application filed October 18, 1907. Serial No. 398,036.

*To all whom it may concern:*

Be it known that I, ERVIN S. KINTZ, a citizen of the United States, residing at Kenmore, in the county of Summit and State of Ohio, have invented new and useful Improvements in Vehicle-Wheels, of which the following is a specification.

This invention relates to vehicle wheels provided with pneumatic, solid or cushion tires of elastic material, more particularly pneumatic tires of the double tube type having contractible, inextensible or semi-inextensible beads or edges, and the object thereof is to so construct the wheel as to enable the tire to be quickly applied or removed when necessary.

The invention further aims to provide a wheel of the class referred to with a new and improved holdfast means for the tire, hereinafter more specifically described, said means fixedly securing the tire in position so that the same will not be displaced in any manner and said means being readily removable to permit of the mounting and dismounting of a tire on said wheel.

The invention further aims to provide a vehicle wheel of the class referred to with a new and improved rim, hereinafter more specifically described, said rim coöperating with the holdfast means for the tire, said rim and means being simple in construction, strong, durable, efficient in use, inexpensive to manufacture, readily applied to wheels and enabling a tire to be readily removed when occasion requires.

Other advantages constituting objects of this invention will more fully appear in the subjoined description.

A practical embodiment of this invention is illustrated in the accompanying drawings in which similar reference numerals indicate like parts in the different figures.

In the drawings, Figure 1 is a cross-sectional and perspective view of a rim and tire portion of a wheel constructed in accordance with this invention, also showing the holdfast means for securing the tire, said holdfast means arranged in operative relation with respect to that form of tire known as the clencher type; Fig. 2 is a side elevation of a ring employed in this device; and, Fig. 3 is a view similar to Fig. 1 showing the means for securing the locking ring in position.

Referring to the specific form of wheel shown in the drawings, 1 denotes a flat rim having one side formed with an endless outwardly-extending flange 2 forming an abutment to receive the rabbeted outer portion of an endless annular tire-holding means 3 arranged to be mounted on the rim 1 and be held from lateral movement by means of the flange 2. Also mounted on the rim 1 is a second tire-holding device 4 constructed like the tire-holding means 3. The tire-holding devices 3 and 4 in coöperation with the rim 1 constitute a channel or tire seat in which is mounted a clencher type of tire comprising an outer casing 5 and inner tube 6 constructed in the ordinary manner. The opposite side of the rim 1 from that on which is formed the flange 2 is provided with an inwardly-extending or depending flange 7, both for the purpose of strengthening the rim as well as to serve as a guide for a locking ring used for maintaining the tire-holding device 4 from lateral displacement when the tire is inflated. At preferably regularly recurring intervals throughout the entire rim and slightly spaced from the flange 7 are a plurality of slots or openings 8 formed entirely through the flat portion of the rim and so positioned as to lie immediately outside of the rabbeted portion of the member 4 when the same is in engagement with an inflated tire.

In mounting the rim 1 on a felly 11 of a wheel it will be so positioned that a space or channel 20 intervenes between the depending flange 7 and the face of the felly. This channel 20 is used to receive a locking ring, shown in Fig. 2 and referred to by the reference numeral 9, which is arranged to seat therein. This locking ring 9 is provided on its outer periphery with a plurality of preferably regularly-recurring lugs or teeth 10 the spaces intervening between them being equal to the spaces between the openings or slots 8 in the rim, so that when the ring 9 is mounted in the channel 20 between the flange 7 and the felly of the wheel the lugs or teeth 10 will project outwardly through the openings 8 and constitute stops or abutments for preventing lateral movement of the tire-holding device 4. In order to place this ring 9 in the channel it is broken or split at a point indicated by the reference numeral 12 which preferably occurs between two of the lugs or teeth 10. The faces of the ring at the point of severance are preferably inclined for a purpose to be hereinafter set forth. In setting up a wheel in connection with this invention, the tire-holding device 3 is slipped sidewise onto the rim 1 until this rabbeted portion engages the flange 2. This is followed by the tire, in a deflated condition, and this by the tire-holding device 4. It will be noted in doing this that as the tire is deflated, the tire-holding device 4 can be pushed toward the lateral transverse center of the rim sufficiently far to leave the openings or slots 8 unobstructed and the ring 9 is then sprung into the channel 20 formed by the depending flange 7 and the side of the felly 11, in doing which the ring is so positioned that the teeth 10 will be in radial alinement with the openings 8 and will project therethrough sufficiently to constitute stops or abutments for the tire-holding device 4, thereby preventing the same being slid laterally from off the rim. This ring is so made as to be self-expansible and it therefore retains itself in position and the teeth thereof project from the openings 8 by reason of its own inherent resiliency. This tendency of the ring to be self-maintaining is also aided by the fact that when the wheel is revolving at a high speed the centrifugal action set up by the motion of the wheel causes the ring to hug the bottom of the channel 20.

In order to permit the sliding of a tire onto the rim 1 when the tire is provided with an inflating tube, a transverse slot 13 is cut into the rim 1 from the side which bears the flange 7 and a corresponding slot 14 cut in the felly, so that the inflating tube will offer no obstruction to the passage of the tire onto the rim. Experience has demonstrated that it will be sometimes necessary to employ other means for maintaining the locking ring 9 in its expanded condition than its own resiliency and the centrifugal action developed by the revolution of the wheel; and hence a keeper 15 is preferably provided which is arranged to be pivoted on a bolt 17 and held in operative position by a holdfast device such as a pin or bolt passing through a perforation 18 in its opposite end which engages in a corresponding opening 19 in the side of the felly. This keeper is provided on one face with a wedge-shaped portion 16, for a purpose to be stated. When the keeper 15 is used it will be preferably so positioned as to close the slot 14 cut in the felly when in its operative position and the locking ring 9 will be so placed that the broken portion thereof will also be opposite this slot. Thus the keeper will act as a closure device for the slot for preventing the entrance therein of foreign substances. When the locking ring is seated properly in the channel, the keeper is swung upwardly into its operative position causing the wedge-shaped portion 16 to enter the space between the inclined ends of the broken ring, thereby expanding the same and causing the teeth 10 to interlock more firmly with the rim 1. The action of the keeper 15 is to expand the ring circumferentially and as the amount of expansion is limited by the bottom of the channel 20, the ring itself is securely locked against displacement. When the keeper is in its operative position, a holdfast device is inserted through the opening 18 into the opening 19 made to receive the same and the keeper itself is fixedly secured in position. In order to dismount a tire from a rim of this construction, the keeper is swung into its inoperative position, shown in Fig. 3, the locking ring 9 sprung from its seat in the channel 20, the tire-holding device 4 withdrawn sidewise from the rim and the tire slid laterally from its seat.

It will be obvious that it is entirely within the scope of this invention to make the tire-holding means 3 and the flange 2 integral with the rim 1, thereby reducing the number of parts, this being done by simply bending upward and inward the side edge of the rim and it will be apparent that the same results will be accomplished if the rim is made in this manner as if it were made in the manner heretofore described.

Having thus described my invention, what I claim and desire to secure by Letters Patent, is:—

The combination in a vehicle wheel, of a felly and rim forming a tire seat mounted thereon provided with an inwardly-extending flange spaced apart from said felly to form an annular channel, said rim being further provided with a plurality of alined openings in open communication with said channel, a tire-holding device mounted on said rim, and a self-expansible ring in said channel carrying means arranged to extend through said openings and constitute abutments for preventing lateral displacement of a tire-holding device mounted on said rim.

In testimony whereof I have hereunto set my hand in presence of two subscribing witnesses.

ERVIN S. KINTZ.

Witnesses:
 GLENARA FOX,
 C. E. HUMPHREY.